United States Patent Office 2,918,141
Patented Dec. 22, 1959

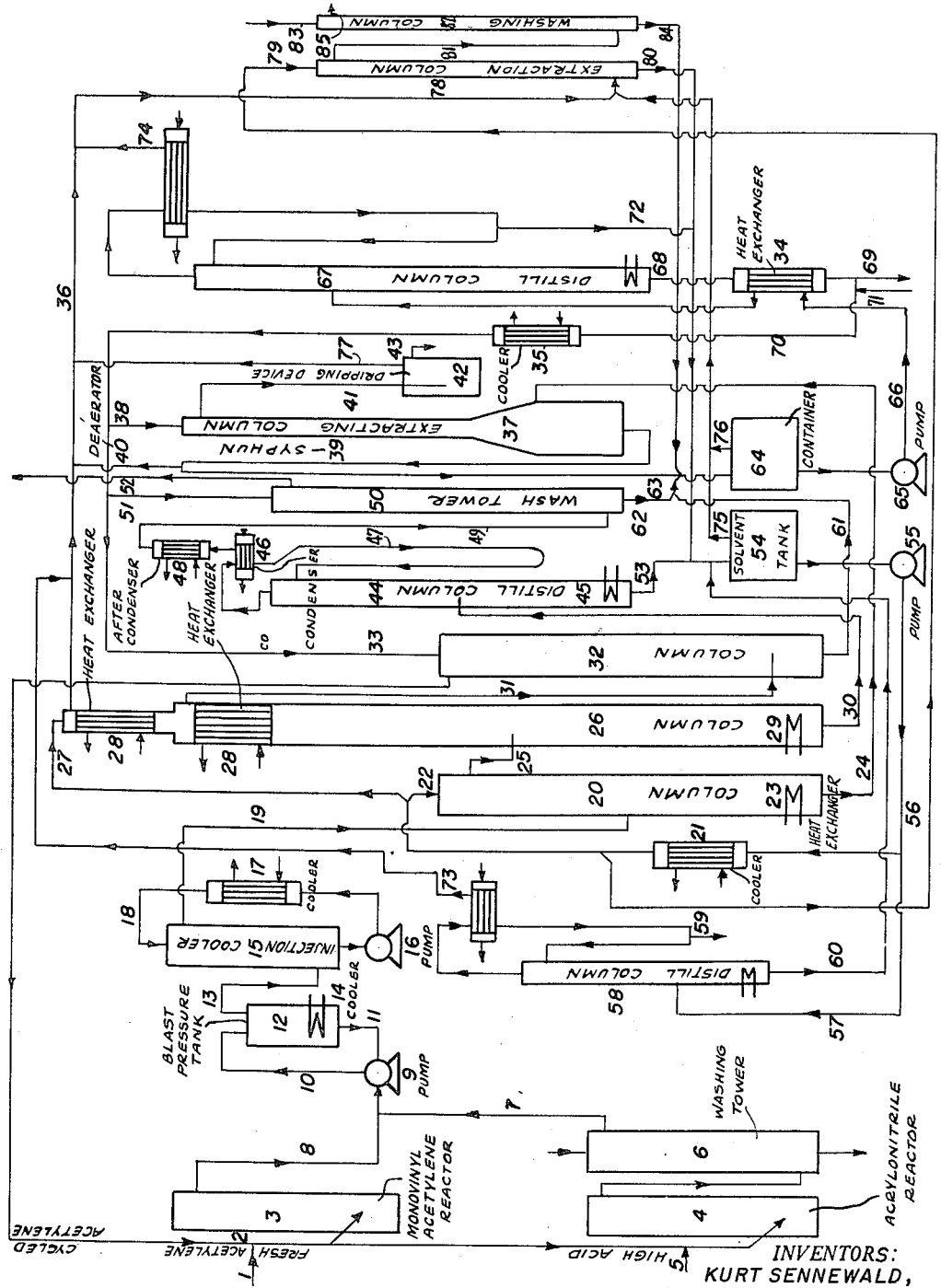

2,918,141

PROCESS FOR SEPARATING MONOVINYL-ACETYLENE FROM GAS MIXTURES

Kurt Sennewald, Franz Pohl, and Wilhelm Vogt, Knapsack, near Koln, Willi Meininger, Efferen, near Koln, Lambert Meyer, Knapsack, near Koln, Hermann Glaser, Hermulheim, near Koln, and Karl-Heinz Steil, Knapsack, near Koln, Germany, assignors to Knapsack-Griesheim Aktiengesellschaft, Knapsack, near Koln, Germany, a corporation of Germany Application June 29, 1956, Serial No. 594,763

Claims priority, application Germany July 5, 1955

12 Claims. (Cl. 183—115)

The present invention relates to a process for producing pure monovinyl-acetylene from a moist acetylene-containing gas mixture with the use of organic solvents.

Aqueous, hydrochloric solutions of cuprous chloride which in most cases contain ammonium chloride or other salts for dissolving cuprous chloride by complex formation are used as so-called Nieuwland catalysts, for example for the production of monovinyl-acetylene or acrylonitrile.

In the production of monovinyl-acetylene only acetylene is passed through the catalyst whereas in the manufacture of acrylonitrile, hydrocyanic acid is admixed to the acetylene introduced. Depending on the proportion of acetylene:hydrocyanic acid a more or less large quantity of monovinyl-acetylene is produced in addition to acrylonitrile.

Apart from the effect displayed in these two principal reactions, the Nieuwland catalyst always promotes side-reactions, for example the trimerization, i.e. the addition of acetylene to monovinyl-acetylene so as to form divinyl-acetylene, the dimerization of monovinyl-acetylene and, in addition thereto, the formation of higher acetylene polymers which cause the formation of resinous products. Further side reactions which occur is the addition of water and hydrogen chloride to acetylene and monovinyl-acetylene whereby acetaldehyde, methylvinylketone, vinyl chloride and chloroprene are formed. From these side reactions the formation of acetaldehyde and vinyl chloride preponderate. When acrylonitrile is produced simultaneously, there are also obtained lactic acid nitrile, cyan-butadiene and other substances.

All these side reactions are very undesirable in the production of monovinyl-acetylene and acrylonitrile because they reduce the yield, involve resinification and hence operating disturbances, give rise to increased losses in catalyst and render the manufacture of pure mono-vinyl-acetylene or acrylonitrile more difficult.

The formation of the especially undesirable acetylene polymers, such as divinyl-acetylene and higher acetylene polymers, and also the formation of chloroprene and methylvinylketone can be reduced by maintaining a low partial pressure of monovinyl-acetylene in the reaction chamber. This measure requires the reaction to be carried out with a great excess of acetylene. Hence it is necessary, on the one hand, to isolate the desired and undesirable reaction products contained in the escaping acetylene current in a very small concentration, in which case special importance has to be attached to the purity at least of the desired products and, on the other hand, it is necessary to free the acetylene itself fairly quantitatively from the reaction products, which is then recycled into the reaction process.

The present invention is concerned with the production of pure monovinyl-acetylene, regardless whether it is obtained as valuable by-product in the manufacture of acrylonitrile, or as principal product without simultaneous formation of acrylonitrile. For the simultaneous production of monovinyl-acetylene and acrylonitrile in separate reactors operated under different conditions, it is even advantageous from an industrial or economical point of view to combine the reacted gases after the separation of the acrylonitrile, for example, by washing with water, so as to isolate and to purify the monovinyl-acetylene obtained in both reaction stages in one single apparatus, and to redistribute the purified acetylene onto the individual reactors.

Therefore, attempts have been made to the effect to cool the entire gas current to a temperature of, for example, $-70°$ C. so as to remove by condensation the substances boiling at a higher temperature than acetylene, and to separate the condensate by distillation. However, such procedure is disadvantageous because extremely low temperatures must be applied which is especially expensive, and also involves the use of extraordinarily large-sized gas coolers, condensers and heat exchangers. Apart from that, the distillation of the condensate which, likewise, has to be performed at a low temperature, is beset with difficulties and is expensive and, moreover, dangerous; it should be noted that monovinyl-acetylene, for example, has a still stronger tendency than acetylene to undergo explosive decomposition.

The known processes involve the further disadvantages that the gas is not completely freed from monovinyl-acetylene, though it is cooled to about $-70°$ C., since monovinyl-acetylene still has a partial pressure of 10 mm. of mercury at a temperature of $-70°$ C., whereby the capacity of the monovinyl-acetylene reactor is diminished and hence the quantity of gas to be recycled into the process and calculated upon the amount of monovinyl-acetylene, is increased; in this respect it should be noted that for the reasons set forth above, the reaction gas prior to having been cooled and condensed, that is to say behind the reactor, should have a partial pressure not higher than 40–60 mm. of mercury; it should also be noted that the reaction gas which is saturated with water must be dried prior to cooling to $-70°$ C. or that substances have to be admixed to the reaction gas to prevent separation of ice.

It has also been proposed to extract the monovinyl-acetylene and all other by-products using hydrocarbon oil fractions of low vapor pressure. This process requires the use of great amounts of said oil because of the small solubility of, for example, monovinyl-acetylene. On the other hand there are very narrow limitations when trying to make use of the increase in solubility which, generally is associated with the application of low temperatures or a raised pressure, since the viscosity of the high-boiling oils rises strongly with a falling temperature. Accordingly, the load capacity of the extraction apparatus is strongly reduced. As is known, the pressure cannot be raised in the presence of undiluted acetylene and mono-vinyl-acetylene because a higher pressure increases the danger of explosion. In order completely to remove the monovinyl-acetylene dissolved in the oil, the application of relatively high temperatures is necessary whereby the polymerization and resinification of by-products which have also dissolved, such as acetaldehyde, divinyl-acetylene, chloroprene etc. is accelerated. Consequently, the washing oil is contaminated. The removal of ingredients boiling at a higher temperature than monovinyl-acetylene, for example by steam distillation, involves losses in solvent, since low-boiling ingredients of the washing oil corresponding to their partial pressure are likewise removed.

It has also been proposed to extract the by-products formed during the manufacture of acrylonitrile, especially monovinyl-acetylene, with acrylonitrile itself. The extracted substances and the dissolved acetylene are then removed by distillation with formation of a reflux by a partial condensation. The gases which escape at the top of the column, especially acetylene, are again subjected to a partial condensation whereby especially the monovinyl-acetylene is further concentrated. However, the known process did not allow for separating the by-products from one-another or of producing monovinyl-acetylene of a good purity and free from acetylene and by-products. Apart from that, the known process was concerned solely with the purification of the cycled current of acetylene.

All the aforesaid disadvantages can be overcome by the process of this invention which enables the monovinyl-acetylene to be produced in a simple manner with a high degree of purity. As has already been mentioned, this invention relates to the production of monovinyl-acetylene with a high degree of purity from a moist acetylene-containing gas mixture with the use of organic solvents, wherein the cooled gas mixture which has been freed from acid components is extracted under a pressure of 1 to 1.5 atmospheres (gauge) with a mixture of solvents consisting substantially of acetone. The individual reaction products and the water contained in the reaction mixture are removed from the reacted gas successively in two extraction columns by washing with the solvent so that there are washed out in the first extraction column the substances of a higher boiling point than monovinyl-acetylene, such as divinyl-acetylene, chloroprene, high molecular acetylene polymers, high molecular ketones, aldehydes and water and in the second extraction column monovinyl-acetylene. Provided this column is operated under the same pressure as the first extraction column then a lower temperature or a higher solvent volume has to be used. The course of temperature in the columns is adjusted in a manner such that the amount of the lower boiling ingredients which are dissolved becomes permanently reduced in the lower part of the solvent and these ingredients are then completely removed from the solvent in a discharge column by heating at the boil and subsequently are recycled into the gas current.

In carrying out the process of this invention it is advantageous to use a mixture of solvents which substantially consists of acetone and contains up to 20%, preferably 10–15%, of acetaldehyde, or to use a mixture of acetone and acetaldehyde containing furthermore 2–10% of water, preferably 4–7%, and 1–10%, preferably 2–5% of divinyl acetylene and/or chloroprene. As acetaldehyde there may be used the acetaldehyde obtained in the monovinyl reactor as a by-product. There may also be used commercially pure acetone which in the course of the process leads to a solvent mixture of the above concentration.

If desired, the monovinyl-acetylene so produced is then removed from the solvent over the top of a column operated under normal pressure, and traces of higher boiling ingredients are retained by subjecting part of the solvent vapors contained in the monovinyl-acetylene to a condensation in a condenser, where the separated solvent may display an extractive effect on the higher boiling ingredients. The other proportion of solvent is removed by washing with water free from air, for example, condensed water.

Following that, the higher boiling ingredients contained in the solvent may be decomposed in a counter-current extraction apparatus to obtain a water-soluble and a water-insoluble component by admixing water free from air, for example condensation water; the water-insoluble proportion which consists of divinyl acetylene, chloroprene and higher acetylene polymers is then withdrawn from the apparatus in a concentrated form and the liquid contents of the extraction apparatus are used as water seal.

The solvent vapors may be removed from the acetylene and the waste gases by washing with water free from air, for example condensed water.

The combined washing waters may be freed by one single distillation from acetone and acetaldehyde which may again be admixed to the cycled solvent and the high boiling ketones and aldehydes, such as methyl vinyl ketone and crotonaldehyde, may then be removed with part of the washing waters.

To this end it is advantageous that the freshly formed acetaldehyde is distilled off from a partial current of the solvent and separated in a pure form. In carrying out the process of this invention there may be used, partially or wholly, an apparatus as described below and as shown diagrammatically in the accompanying drawing.

In the drawing the numerals designate the following parts: Fresh acetylene containing 1–2% of inert gases from conduit 1 is combined with the purified recycled acetylene from conduit 2 which is under a pressure of 1–1.5 atmosphere (gauge). The mixture of fresh and recycled acetylene is introduced into the lower part of monovinyl-acetylene reactor 3 and, in case acrylonitrile shall be produced at the same time, into acrylonitrile reactor 4 after hydrocyanic acid has been admixed through conduit 5. In washing tower 6, the reaction gas from the acrylonitrile reactor is freed from acrylonitrile by washing with water and then combined through conduit 7 with the weakly acid reaction gases from the monovinyl-acetylene reactor which have been saturated with steam at a temperature of +70–+90° C. and which emanate from conduit 8. Compressor 9, for example a pump with a water circumferential joint, conveys and compresses the combined gases via conduit 10 together with the cycled water of the compressor from conduit 11, and the whole is conveyed to blast pressure tank 12 filled with Raschig rings or another material with a great surface. The gas which is now under a total pressure of between 1 and about 1.5 atmospheres (gauge) with a partial pressure of monovinyl-acetylene of 80–120 mm. of mercury and a partial pressure of the by-products of not more than 10–20 mm. of mercury, is then withdrawn at the top of blast pressure tank 12 by means of conduit 13, whilst the separated water which has been cooled by cooler 14 flows back to compressor 9. Compressor 9 and blast pressure tank 12 are made of acid proof material. By mixing the reaction gases with the cycling water the gases become simultaneously cooled, for example to a temperature of about +20–+30° C. and acid components are removed. It is therefore advisable as soon as the water contains too much acid to replace part thereof by fresh water. Injection cooler 15 filled, for example with Raschig rings, enables the temperature of the reaction gases to be further reduced, for example to +5 to +20° C. The reaction gases are introduced into the lower part of the cooler through conduit 13 and pump 16 serves to introduce from above and through conduit 18 cooled cycled water through cooler 17 which is charged with cold water. The cooled and moist gases leave injection cooler 15 at the top through conduit 19 and are introduced into a column 20 provided with filling material or exchangeable bottoms. The column is charged from above through conduit 22 with a mixture of solvents cooled with cooler 21 to, for example +5–+10° C.; the mixture consists substantially of acetone and contains about 5% of water, about 5% of a mixture of divinyl acetylene and chloroprene, for example in a weight proportion of 70:30, and about 10–15% of acetaldehyde. The lower part of the column is heated to a temperature of about +80–+90° C. by means of heat exchanger 23. The pressure at the column is so high that the aforesaid mixture of solvents substantially is still liquid at these temperatures. The cooled acetone introduced at the top of the column, the evaporation of the acetone, the absorption heat set free and the heating at the bottom of the column enable the temperature gradient to be adjusted in the column in a manner such that the mixture of solvents flowing down becomes permanently reduced in downward direction by the acetylene and monovinyl acetylene absorbed in the upper part of the column; at the bottom of the column it is completely free from acetylene and monovinyl-acetylene and is removed through conduit 24, whereas the high-boiling ingredients of the gas which are more readily soluble than acetylene and monovinyl-acetylene, such as water, divinyl acetylene, chloroprene, higher acetylene polymers and higher-boiling water-soluble ketones and aldehydes, such as methyl vinyl ketone and croton-aldehyde, substantially are retained and withdrawn together with the solvent.

As follows, this invention extends also to drying the acetylene which is to be recycled and to the simultaneous and almost complete removal of the higher-boiling ingredients in one single column with a temperature gradient, the removal of these ingredients being performed prior to the separation of acetylene and monovinyl-acetylene from one another.

The gases leave at the top of column 20 through conduit 25 and are introduced as shown in the drawing into column 26 containing filling material or provided with an exchangeable bottom and having a strongly contracted upper part. The cooled mixture of solvents having the composition described above is communicated to the top of the column through conduit 27, the top of the column serving as heat exchanger 28, for example as spray cooler. In the lower part the column is heated by heating device 29. The two heat exchangers 28 are charged with cold water to eliminate the absorption heat substantially set free in these heat exchangers. The temperature prevailing in the upper heat exchanger 28, into which, generally, only a small quantity of gas is introduced, is advisably somewhat below the temperature prevailing in lower heat exchanger 28. It is also possible that the same temperature may prevail in both heat exchangers. In the upper heat exchanger the acetylene contained in the quantity of gas introduced into this exchanger is almost completely dissolved. By this measure there is again produced, as in column 20, a temperature drop which for example at the top of the column is between 0 and +20° C. and in the swamp between +70 and +80° C. This temperature drop causes the mixture of solvents to become permanently reduced from above to below, the solvent mixture being reduced in this case only with respect to acetylene, so that monovinyl-acetylene and any other higher-boiling by-products, if any, are retained in the mixture of solvents, which is then withdrawn through conduit 30. The current of acetylene gas which is now practically free from all reaction products and, corresponding to the partial pressure, contains only vapor of acetone and acetaldehyde, leaves column 26 through conduit 31 and is then introduced into the lower part of column 32 containing filling material or provided with an exchangeable bottom; column 32 is charged through conduit 33 with condensed water which has been cooled by heat exchanger 34 and cooler 35. The cycled acetylene after having been washed with water is completely free from acetaldehyde and acetone vapors and is reintroduced into the reactors through conduit 2.

The use of water free from oxygen for the removal of acetone and acetaldehyde from the gas cycle likewise falls within the scope of this invention.

The inert gases which, for example are contained in the fresh acetylene and thus join the cycle, are withdrawn at the top of the strongly contracted part of column 26, through conduit 36, in order to avoid a concentration of these gases in the acetylene cycle, for example a concentration exceeding 10%.

All apparatus so far described which are behind the compressor in the gas cycle are filled with filling material or provided with exchangeable bottoms which are sprayed with water or a mixture of solvents. Moreover, all gas conduits may be filled with a material having a large surface or with steel wool, or may be used in the form of capillary tubings. It is a well known fact that apparatus of the kind described above are capable of avoiding to a far extent the explosive spontaneous decomposition of acetylene and monovinyl-acetylene. The danger of a spontaneous decomposition of the aforesaid compounds can be further diminished by diluting the gas in the gas chambers of the large sized extraction columns by means of the vapor of the relatively low-boiling acetone, and more especially of the still lower boiling acetaldehyde. The high partial pressure of the solvent mixture which is far above 1 atmosphere protects above all the higher-tempered gas chambers of the apparatus and among these especially those into which heat is introduced, that is the chambers at the bottom of columns 20 and 26, which especially involve the risk of being superheated and hence the risk of a spontaneous decomposition; this the more so since in these chambers prevails the highest concentration of the monovinyl-acetylene which decomposes still more easily than acetylene. Both the apparative measures and the choice of the composition of the solvent mixture prevent a spontaneous decomposition of acetylene and monovinyl-acetylene to an extent such that it is possible, as has already been described to perform without danger all these stages in the process even with application of pressure, for example under a pressure of 1–1.5 atmospheres (gauge), and this is a particularly important feature of this invention.

Since the solubility of the gases in the solvent practically increases directly proportionally in relation to the pressures applied, the application of pressure, as compared with the process carried out under normal conditions and atmospheric pressure, allows for an economization of solvent and enables extraction columns with a smaller diameter to be used. This latter fact is especially valuable when operating with great gas cycles as in the process of this invention, and this the more so when the size of the apparatus required in carrying out the process at atmospheric pressure has reached a limit which necessitates apparatus of a double capacity to be used.

Moreover, it is possible to operate at low extraction temperatures which at the top of the extraction columns for the solvent are as low as between +5° C. and +20° C. or even lower; these temperatures allow of further increasing the solubility since in relation to the high-boiling hydrocarbon-fractions the increase in viscosity of the solvent used in the process of this invention is immaterial; apart from that the acetone as main constituent of the solvent exhibits a multiple of the dissolving power for monovinyl-acetylene than, for example, hydrocarbon-fractions.

The mixture of solvents enriched with water, divinyl acetylene, chloroprene, higher acetylene polymers, higher ketones and aldehydes, which is withdrawn from the lower part of column 20 is conveyed through conduit 24 into the strongly enlarged part of extraction column 37 and released; column 37 is operated under about normal pressure and charged from above with water free from oxygen, for example condensation water, which is introduced through conduit 38. The water introduced is withdrawn together with the dissolved acetone through syphon 39 deaerated by means of pipe 40. The syphon is so high that column 37 is practically filled with water. The water in the column which slowly flows in downward direction has the effect that all hydrocarbon-like derivatives of acetylene which are soluble in acetone and practically insoluble in water, such as divinyl acetylene, or chloroprene, become separated in the form of very fine drops which, depending on their solubility, may still contain some acetone. Since these hydro-carbon-like acetylene derivatives have a smaller specific gravity than the aqueous acetone solution, they ascend in the column and are accordingly washed completely free from acetone by the water flowing in counter-current; they follow pipe 41 and are then withdrawn through water dipping device 42 and pipe 43.

A further feature of this invention is the separation and isolation of higher acetylene polymers, especially divinyl acetylene which tends to the formation of explosive peroxides, without losses in solvent being involved; these two steps are performed without application of heat in an extraction column the lower part of which is strongly enlarged; the extraction column is practically completely filled with water free from dissolved oxygen and, therefore, allows of operating with a minimum of danger. The enlarged part of the column serves to give the particles separated sufficient time for separating in the upper part.

The mixture of solvents free from acetylene and containing all monovinyl-acetylene leaves column 26, is conveyed through conduit 30 into distillation column 44 and released as shown in the accompanying drawing. This column is operated at about normal pressure like extraction column 37 described above. By heating the sump of the column by means of heating device 45 to the boiling point of the solvent mixture, for example to +50 to +60° C. and by partial condensation in condenser 46 there is produced a solvent reflux enriched with monovinyl-acetylene and acetaldehyde, which is re-supplied to the top of the column through pipe 47. Monovinyl-acetylene which has not been condensed escapes through the top of condenser 46 together with the vapors of the solvent, passes through after-condenser 48 which is kept at a temperature of about +10 to —10° C. by means of cold water or brine and is then conveyed through conduit 49 into the lower part of washing tower 50 containing filling material or provided with exchangeable bottoms and charged from above through conduit 51 with water free from oxygen and cooled in cooler 35. The after-condenser 48 which, conveniently, is constructed so that it can simultaneously be used, as cooler and film absorber, serves to remove from the gas current of monovinyl-acetylene traces of for example divinyl acetylene or chloroprene. It is operated in a manner such that by partial condensation of the acetone and acetaldehyde vapors a small reflux is produced, which as cooled and downwardly flowing film is capable of removing from the gas current practically quantitatively the traces of divinyl acetylene and chloroprene.

The residual acetone and acetaldehyde vapors are absorbed in washing tower 50, so that moist monovinyl-acetylene which, apart from its content of moisture, is practically of 100% strength can be withdrawn through pipe 52. The moisture adhering to the monovinyl-acetylene does not affect the working up to obtain chloroprene and may be removed by simple drying for example with calcium chloride or caustic potash. The solvent mixture freed from the monovinyl-acetylene leaves at the bottom of column 44 through conduit 53 and flows to solvent tank 54; with the aid of pump 55 it is conveyed through pipe 56, cooler 21 and conduits 22 and 27 to extraction columns 20 and 26. Before cooler 21, a small branch current of the solvent mixture is branched off through pipe 57 and introduced into distilling column 58 operated under about normal pressure. In column 58, the acetaldehyde formed in a small proportion in the monovinyl-acetylene reactor is removed by distillation in known manner from the solvent mixture containing 10–15% of acetaldehyde. The acetaldehyde is obtained in column 59 with a high degree of purity, and this the more so since acetaldehyde may be retained in the sump of the column and may then be reintroduced into storage tank 54 through pipe 60.

A further feature of this invention is the removal of monovinyl-acetylene under practically atmospheric conditions, the purification of monovinyl acetylene in an after-condenser serving, for example as film absorber, and the production of pure acetaldehyde which is formed as a by-product, from a mixture of solvents containing 10–15% of acetaldehyde.

The mixture containing water, acetone and other higher boiling and water-soluble constituents flowing off from washing columns 32, 50 and 37 through pipes 61, 62 and 63, is conveyed to container 64 and then pumped with pump 65 through conduit 66 and heat exchanger 34 into distilling column 67. In this latter column the acetone and acetaldehyde are removed from the water in known manner by distillation. Very small amounts of higher-boiling water-soluble ketones and aldehydes, substantially methyl vinyl ketone and crotonaldehyde, are retained in the water in a dissolved form. These ingredients and the water which is completely free from acetone are withdrawn from the lower part of the column 67 through pipe 68 and heat exchanger 34. Part of the water is removed through pipe 69 to prevent concentration of the high-boiling ketones and aldehydes which tend to resinification. Another part of the water may be recycled into the afore-described washing processes through pipe 70 and cooler 35. The amount of water removed is replaced by condensation water through pipe 71. The mixture of acetone and acetaldehyde withdrawn as distillate over the top of column 67 is conveyed to solvent tank 54 through pipe 72.

The use of water free from air in all washing processes, condensed water being preferred in industry, prevents oxygen from penetrating into the separation device as it would be the case if normal water containing dissolved oxygen was used. It has been found that above all in a continuous process, the oxygen introduced with normal water in contact with divinyl acetylene gives rise to the formation of dangerous peroxides and also initiates catalytically the unsaturated components to undergo polymerisation so as to form resinous substances which cause operating disturbances. The use of condensed water according to this invention is therefore of special importance.

Column 67 is intended to recover the solvent from the water and, at the same time, has the effect in a simple manner to purify the solvent from the polymerizable and resin-forming higher ketones and aldehydes which, when retained in a high concentration in the solvent or washing water, give rise to operating disturbances in a continuous process. The recovery and simultaneous purification of the solvent from the higher easily polymerizable and unsaturated aldehydes and ketones as well as their removal in a very dilute solution is a further feature of this invention.

The inert gases escaping at the top 28 of column 26 through pipe 36 are combined with those escaping from ventilating pipes 73 and 74 of distilling columns 58 and 67; they are also combined with the gases of ventilating pipes 75, 76 and 77, of containers 54 and 64 and of dipping bath 42, and of ventilating pipe 40 of syphon 39. They are introduced into the lower part of extraction column 78 which is charged from above through pipe 79 with a small amount of the solvent mixture cooled in cooler 21. The small amounts of acetylene and monovinyl-acetylene are washed out and, dissolved in acetone, they are conveyed through pipe 80 into tank 54 wherein the solvent is stored. The inert gases which contain acetone and solvent vapors and have not been dissolved in column 78 are introduced through conduit 81 into the lower part of extraction column 82 onto which a small amount of water is sprayed through pipe 83. The solvent vapors dissolved in water leave at the bottom of column 82 through pipe 84 and are then conveyed to container 64 and further, as has already been described, to distilling column 67 to recover the solvent. The inert gases which are now only water-moist leave washing tower 82 through pipe 85.

The disclosure of the last part of the apparatus evidences that in spite of the numerous by-products which, in most cases, are formed in a minor proportion and present in a minor concentration, practically no losses in solvent, acetylene or monovinyl-acetylene are involved;

this is supported by the undisturbed continuous operation of the entire plant.

The process of this invention offers the particular advantage of enabling all steps disclosed to be applied in combination, which is particularly advantageous. The present invention, therefore, comprises also all devices disclosed in the descriptive part and the drawing, the individual devices being connected with each other in the manner as shown diagrammatically in the accompanying drawing.

The following example serves to illustrate the invention, but it is not intended to limit it thereto:

*Example*

40 m.$^3$ of moist reaction gas under a pressure of 1.5 atmospheres (gauge) obtained from the monovinylacetylene reactor, deacidified as described and cooled to +5° C., are extracted per hour in column 20 with 30 l. of a solvent mixture, of +5° C. consisting of 12% of acetaldehyde, 2% of a mixture of 70 percent by weight of divinylacetylene and 30% by weight of chloroprene, 6% of water and 80% of acetone. The solvent mixture leaves at the bottom of the column free from acetylene and monovinyl-acetylene with a temperature of +86° C.; after cooling, it is extracted in counter-current in an extraction column 37 charged with 100 l. of condensed water and filled with water. 2 kg. of a light-brown liquid which is practically free from acetone are obtained at the top of the column. The liquid consists of about 80% of divinyl acetylene and about 20% of chloroprene and higher acetylene polymers which are withdrawn through dipping bath 42 and pipe 43. The reaction gases which are now practically dry and freed from the major part of the high-boiling substances being more easily soluble than acetylene and monovinyl-acetylene, are extracted with 250 l. of the above mixture of solvents in column 26 operated under a pressure of 1.3 atmospheres (gauge). By cooling with water of +1° to +2° C. the top of the column is kept at a temperature of +5° to +7° C. The solvent leaves free from acetylene and containing the total amount of the monovinyl-acetylene with a temperature of +70 to +75° C. at the bottom of the column and is freed by distillation under atmospheric pressure from the dissolved monovinyl-acetylene. The latter flows through the after-condenser and is freed in known manner from traces of divinyl acetylene and chloroprene and, by washing with condensed water in column 50, it is also freed from the solvent vapors by introducing 100 l. of water. 5.3 m.$^3$ of a practically 100% monovinyl-acetylene, apart from the adhering moisture, leave the apparatus through pipe 52. By introducing 250 l. of condensed water into column 32 which is under a pressure of about 1.1 atmospheres (gauge) the acetylene which is free from all reaction products is freed from solvent vapors and then recycled into reactor 3 after the addition of 12.8 m.$^3$ of fresh acetylene. The washing water collected in container 64 contains about 10% of acetone and acetaldehyde as well as very small amounts of methyl vinyl ketone and crotonaldehyde; at a reflux ratio of 1:0.7 with a water content of 5–6%, 50 kg. of acetone and acetaldehyde are distilled off in column 67 from the water-solvent mixture and are then reintroduced into the solvent cycle. 100 l. of water completely free from acetone and acetaldehyde and containing 0.2 kg. substantially of methyl vinyl ketone and crotonaldehyde are withdrawn through pipe 69, whereas 400 l. of the above water are recycled after the addition of 100 l. of fresh condensed water. In column 58 there are obtained by distillation of part of the solvent 0.5 kg. of pure acetaldehyde, which content of acetaldehyde retained in the sump of the column is adjusted to 5%. 200 l. of inert gases are withdrawn through pipe 85 after having been freed from acetylene, monovinyl-acetylene and solvent vapors in the manner described.

We claim:
1. A process for isolating acetylene and monovinylacetylene of high purity which comprises removing from the reacted gas formed in the manufacture of an acetylene derivative selected from the group consisting of acrylonitrile and monovinylacetylene from acetylene, at least one substance selected from the group consisting of acrylonitrile and acid components contained therein by washing it with water, and extracting in a first extraction column the compounds boiling at a higher temperature than monovinylacetylene, simultaneously expelling acetylene and monovinylacetylene from said column, passing said acetylene and monovinylacetylene into a second extraction column, extracting monovinylacetylene from the mixture, and expelling acetylene from said second column, the extraction being performed under a pressure of from about 1 to about 1.5 atmospheres gauge pressure with a solvent mixture consisting substantially of acetone, and, the course of temperature in the columns being adjusted so that the amount of the lower boiling ingredients which are also dissolved, becomes permanently reduced in the lower part of the solvent, and these ingredients being then completely removed from the solvent in a discharge column by heating at the boil and being subsequently recycled into the gas current.

2. A process for the isolation of monovinylacetylene of high purity, which comprises removing from the reacted gas formed in the manufacture of an acetylene derivative selected from the group consisting of acrylonitrile and monovinylacetylene from acetylene, at least one substance selected from the group consisting of acrylonitrile and acid components contained therein by washing it with water, and extracting in a first extraction column the compounds boiling at a higher temperature than monovinyl-acetylene and in a second extraction column the monovinyl-acetylene, the extraction being performed under a pressure of from about 1 to about 1.5 atmospheres gauge pressure with a solvent mixture consisting substantially of acetone, the course of temperature in the columns being adjusted so that the amount of the lower boiling ingredients which are also dissolved, becomes permanently reduced in the solvent in the lower part of the column, and these ingredients being then completely removed from the solvent in a discharge column by heating at the boil and being subsequently recycled into the gas current.

3. A process for the isolation of monovinylacetylene of high purity, which comprises removing from the reacted gas formed in the manufacture of an acetylene derivative selected from the group consisting of acrylonitrile and monovinylacetylene from acetylene, at least one substance selected from the group consisting of acrylonitrile and acid components contained therein by washing it with water, and extracting in a first extraction column the compounds boiling at a higher temperature than monovinyl-acetylene and in a second extraction column the monovinyl-acetylene, the extraction being performed under a pressure of from about 1 to about 1.5 atmospheres gauge pressure with a solvent mixture consisting substantially of acetone and up to about 20 percent of acetaldehyde, the course of temperature in the columns being adjusted so that the amount of the lower boiling ingredients which are also dissolved, becomes permanently reduced in the solvent in the lower part of the column, and these ingredients being then completely removed from the solvent in a discharge column by heating at the boil and being subsequently recycled into the gas current.

4. A process for the isolation of monovinylacetylene of high purity, which comprises removing from the reacted gas formed in the manufacture of an acetylene derivative selected from the group consisting of acrylonitrile and monovinylacetylene from acetylene, at least one substance selected from the group consisting of acrylonitrile and acid components contained therein by washing it with water, and extracting in a first extraction column the compound boiling at a higher temperature than monovinyl-acetylene and in a second extraction column the monovinyl-acetylene, the extraction being performed under a pressure of from about 1 to about 1.5 asmospheres gauge pressure with a solvent mixture consisting substantially of acetone and containing about 10 to about 15 percent of acetaldehyde, which has been isolated as a by-product in this process, the course of temperature in the columns being adjusted so that the amount of the lower boiling ingredients which are also dissolved, becomes permanently reduced in the solvent in the lower part of the column, and these ingredients being then completely removed from the solvent in a discharge column by heating at the boil and being subsequently recycled into the gas current.

5. A process for the isolation of monovinylacetylene of high purity, which comprises removing from the reacted gas formed in the manufacture of an acetylene derivative selected from the group consisting of acrylonitrile and monovinylacetylene from acetylene, at least one substance selected from the group consisting of acrylonitrile and acid components contained therein by washing it with water, and extracting in a first extraction column the compounds boiling at a higher temperature than monovinyl-acetylene and in a second extraction column the monovinyl-acetylene, the extraction being performed under a pressure of from about 1 to about 1.5 atmospheres gauge pressure with a solvent mixture consisting of acetone, containing up to about 20 percent of acetaldehyde, about 2 to about 10 percent of water and about 1 to about 10 percent of a compound selected from the group consisting of divinyl acetylene, chloroprene and mixtures thereof, the course of temperature in the columns being adjusted so that the amount of the lower boiling ingredients which are also dissolved, becomes permanently reduced in the solvent in the lower part of the column, and these ingredients being then completely removed from the solvent in a discharge column by heating at the boil and being subsequently recycled into the gas current.

6. A process for the isolation of monovinylacetylene of high purity, which comprises removing from the reacted gas formed in the manufacture of an acetylene derivative selected from the group consisting of acrylonitrile and monovinylacetylene from acetylene, at least one substance selected from the group consisting of acrylonitrile and acid components contained therein by washing it with water, and extracting in a first extraction column the compounds boiling at a higher temperature than monovinyl-acetylene and in a second extraction column the monovinyl-acetylene, the extraction being performed at a pressure of from about 1 to about 1.5 atmospheres gauge pressure with a solvent mixture consisting of acetone which contains about 10 to about 15 percent of acetaldehyde, 4 to 7 percent of water and about 2 to about 5 percent of a mixture of divinyl acetylene and chloroprene, the course of temperature in the columns being adjusted so that the amount of the lower boiling ingredients which are also dissolved, becomes permanently reduced in the solvent in the lower part of the column, and these ingredients being then completely removed from the solvent in a discharge column by heating at the boil and being subsequently recycled into the gas current.

7. A process for the purification of monovinyl-acetylene which has been produced from acetylene, which comprises washing the reacted gas which is obtained in the manufacture of an acetylene derivative selected from the group consisting of acrylonitrile and monovinyl-acetylene with water, extracting from the reacted gas which is thus freed from acrylonitrile and acid components in a first extraction column the compounds boiling at a higher temperature than monovinyl-acetylene and in a second extraction column the monovinyl-acetylene, the extraction being performed under a pressure of from about 1 to about 1.5 atmospheres gauge pressure with a solvent mixture consisting substantially of acetone, the course of temperature in the columns being adjusted so that the amount of the lower boiling ingredients which are also dissolved, becomes permanently reduced in the solvent in the lower part of the columns, and these ingredients being then completely removed from the solvent in a discharge column by heating at the boil and being subsequently recycled into the gas current, liberating the monovinyl-acetylene from the solvent in a third column operated under about atmospheric pressure, eliminating contaminations of higher boiling compounds by condensing part of the solvent vapors contained in the monovinyl-acetylene gas, and removing the remaining solvent vapors by washing with water free from oxygen.

8. A process for the purification of monovinylacetylene which has been produced from acetylene, which comprises washing the reacted gas which is obtained in the manufacture of an acetylene derivative selected from the group consisting of acrylonitrile and monovinyl-acetylene with water, extracting from the reacted gas which is thus freed from acrylonitrile and acid components in a first extraction column the compounds boiling at a higher temperature than monovinyl-acetylene and in a second extraction column the monovinyl-acetylene, the extraction being performed under a pressure of from about 1 to about 1.5 atmospheres gauge pressure with a solvent mixture consisting substantially of acetone, the course of temperature in the columns being adjusted so that the amount of the lower boiling ingredients which are also dissolved, becomes permanently reduced in the solvent in the lower part of the column, and these ingredients being then completely removed from the solvent in a discharge column by heating at the boil and being subsequently recycled into the gas current, liberating the monovinyl-acetylene from the solvent in a third column operated under about atmospheric pressure, eliminating contaminations of higher boiling compounds by condensing part of the solvent vapors contained in the monovinyl-acetylene gas, removing the remaining solvent vapors by washing with water free from oxygen, dissolving the water-soluble part of the solvent obtained in the sump of the first column in water free from oxygen and isolating the water-insoluble phase, which consists mainly of divinyl acetylene, chloroprene and polymers of at least three acetylene molecules.

9. A process as claimed in claim 8, wherein a solvent mixture containing acetaldehyde is used and the solvent proportions which are contained in the gas leaving the second column, are removed from said gas by washing with water free from oxygen, the water-solvent mixture is combined with the water-solvent mixture obtained from the purification of the monovinylacetylene gas, the acetone and the acetaldehyde are removed therefrom by distillation and are isolated.

10. A process as claimed in claim 9, wherein the acetone and acetaldehyde obtained are recycled into the purification system.

11. A process as claimed in claim 1, wherein acetone is used as solvent.

12. A process for the isolation of monovinylacetylene of high purity, which comprises removing from the reacted gas formed in the manufacture of an acetylene derivative selected from the group consisting of acrylonitrile and monovinylacetylene from acetylene, at least one substance selected from the group consisting of acrylonitrile and acid components contained therein by washing it with water, and extracting in a first extraction column the compounds boiling at a higher temperature than monovinyl-acetylene and in a second extraction column at a lower temperature the monovinyl-acetylene, the extractions being performed under about the same pressure in the range of from about 1 to about 1.5 atmospheres gauge pressure with a solvent mixture consisting substantially of acetone, the course of temperature in the columns being adjusted so that the amount of the lower boiling ingredients which are also dissolved, becomes permanently reduced in the solvent in the lower part of the column, and these ingredients being then completely removed from the solvent in a discharge column by heating at the boil and being subsequently recycled into the gas current.

References Cited in the file of this patent

UNITED STATES PATENTS

| | | |
|---|---|---|
| 2,236,964 | Babcock | Apr. 1, 1941 |
| 2,726,734 | Nirenberg | Dec. 13, 1955 |
| 2,733,259 | DeCroes et al. | Jan. 31, 1956 |